United States Patent
Takahashi

(10) Patent No.: US 9,828,952 B2
(45) Date of Patent: Nov. 28, 2017

(54) FUEL VAPOR CONTROL VALVE AND FUEL VAPOR CONTROL SYSTEM

(71) Applicant: KYOSAN DENKI CO., LTD., Koga, Ibaraki-pref. (JP)

(72) Inventor: Tetsuya Takahashi, Shimotsuke (JP)

(73) Assignee: KYOSAN DENKI CO., LTD., Koga (JP)

( * ) Notice: Subject to any disclaimer, the term of this patent is extended or adjusted under 35 U.S.C. 154(b) by 612 days.

(21) Appl. No.: 14/476,784

(22) Filed: Sep. 4, 2014

(65) Prior Publication Data

US 2015/0211450 A1   Jul. 30, 2015

(30) Foreign Application Priority Data

Jan. 24, 2014   (JP) .................................. 2014-011668

(51) Int. Cl.
   *F02M 33/02*   (2006.01)
   *F02M 25/08*   (2006.01)
   *F16K 31/40*   (2006.01)

(52) U.S. Cl.
   CPC .... *F02M 25/0854* (2013.01); *F02M 25/0836* (2013.01); *F16K 31/402* (2013.01); *F02M 2025/0845* (2013.01)

(58) Field of Classification Search
   CPC .................. F02M 25/0836; B60K 15/03519
   USPC .................................. 123/520; 137/202, 587
   See application file for complete search history.

(56) References Cited

U.S. PATENT DOCUMENTS

| | | | | |
|---|---|---|---|---|
| 4,230,079 A | * | 10/1980 | Kohama | F02M 26/56 123/568.29 |
| 5,099,880 A | * | 3/1992 | Szlaga | B60K 15/03519 123/519 |
| 5,220,898 A | | 6/1993 | Kidokoro et al. | |
| 5,579,742 A | * | 12/1996 | Yamazaki | B60K 15/03504 123/516 |
| 5,967,119 A | * | 10/1999 | Burkhard | F02M 69/54 123/458 |
| 6,003,499 A | * | 12/1999 | Devall | F02M 25/0836 123/516 |

(Continued)

FOREIGN PATENT DOCUMENTS

| | | |
|---|---|---|
| JP | 2002-364766 A | 12/2002 |
| JP | 2005-172070 A | 6/2005 |

(Continued)

*Primary Examiner* — Marguerite McMahon
*Assistant Examiner* — James Kim
(74) *Attorney, Agent, or Firm* — Posz Law Group, PLC

(57) ABSTRACT

A control valve is disposed on a vapor control system which controls vapor. A case and caps hold a diaphragm. The case and the diaphragm define a primary chamber. The caps and the diaphragm define a secondary chamber. The secondary chamber communicates to an inlet passage via a through hole formed as an orifice. An inlet pipe is arranged so that the inlet passage and the secondary chamber are adjacent each other by being separated by an outer wall. By employing this arrangement, the through hole can be formed without increasing a vapor permeable surface area. Since the through hole is not formed on the diaphragm, a stable open-and-close characteristic can be provided. The through hole may be formed by using a molding die for forming the inlet passage. Thereby, it is possible to improve productivity.

14 Claims, 4 Drawing Sheets

(56) References Cited

U.S. PATENT DOCUMENTS

| | | | | |
|---|---|---|---|---|
| 6,588,449 | B1* | 7/2003 | Kippe | F02M 37/103 |
| | | | | 123/509 |
| 7,325,577 | B2* | 2/2008 | Devall | B60K 15/03504 |
| | | | | 123/520 |
| 2010/0051116 | A1 | 3/2010 | Martin et al. | |
| 2012/0199773 | A1* | 8/2012 | Miura | F16K 31/06 |
| | | | | 251/129.15 |

FOREIGN PATENT DOCUMENTS

| | | |
|---|---|---|
| JP | 2008-196669 A | 8/2008 |
| JP | 2013-144942 A | 7/2013 |
| JP | 2013-174184 A | 9/2013 |

\* cited by examiner

FUEL VAPOR CONTROL VALVE AND FUEL VAPOR CONTROL SYSTEM

CROSS REFERENCE TO RELATED APPLICATION

This application is based on Japanese Patent Application No. 2014-11668 filed on Jan. 24, 2014, the disclosure of which is incorporated herein by reference.

TECHNICAL FIELD

The present disclosure relates to a vapor control valve and a vapor control system having the vapor control valve, which controls vapor generated in a fuel tank. In this specification, both fuel vapor and mixture of air and fuel vapor are referred to as a vapor.

BACKGROUND

PLT1 and PLT2 disclose a vapor control valve and a vapor control system having the same. The vapor control valves are disposed between a fuel tank and a canister (charcoal canister), and opens and closes a vapor passage. The vapor control valve switches the fuel tank between a closed state and an open state. The vapor control valve is used in various applications, such as an application for controlling vapor discharge from the fuel tank, or an application for switching the fuel tank to the closed state and the open state intentionally for an inspection purpose.

PATENT LITERATURE (PLT)

PLT1: JP2012-500750A
PLT2: JP2013-144942A
PLT3: JP2005-172070A
PLT4: JP2008-196669A

In the vapor control valve in PLT1, an orifice for introducing back-pressure is formed on a partitioning wall, which is called a diaphragm. However, a size of the orifice formed on a soft partitioning wall may change easily. Accordingly, an open-and-close characteristic of the vapor control valve becomes unstable.

In the vapor control valve in PLT2, a tank side bypassing passage 62 is disposed in order to introduce back-pressure. The passage 62 is formed additionally and in a projecting manner. Such structure enlarges a surface area of a passage that communicates with the fuel tank. Accordingly, a vapor permeable surface area through which vapor, e.g., hydrocarbon HC, can permeate to the air may be enlarged.

PLT3 discloses a valve with an orifice which penetrates a diaphragm. However, since a size of the orifice is not stable, an open-and-close characteristic of this valve is unstable. In addition, this structure requires more number of components, and increases a price. PLT4 discloses a valve with an orifice. But, the structure of the orifice is hard to process.

SUMMARY

In view of the above-mentioned viewpoint or viewpoints which are not mentioned, it is required to improve a vapor control valve and a vapor control system having the same.

It is an object of the present disclosure to provide a vapor control valve which has a stable open-and-close characteristic, while reducing a vapor permeable surface area.

It is an object of the present disclosure to provide a vapor control system which can control vapor flow in a stable manner, while reducing a vapor permeable surface area.

The present disclosure employs the following technical means, in order to attain the above-mentioned object.

According to the present disclosure, a vapor control valve is provided. The vapor control valve has a housing member which is made of resin and defines a volume chamber therein. The vapor control valve has a movable member which is supported by the housing member. The movable member divides the volume chamber into a primary chamber and a secondary chamber. The movable member opens and closes a valve, which is disposed between an inlet passage and an outlet passage, by displacing in response to a pressure difference between the primary chamber and the secondary chamber. The vapor control valve has an electromagnetic valve which is disposed between the secondary chamber and the outlet passage, and changes state between the secondary chamber and the outlet passage to an open state or a closed state. The vapor control valve has a passage forming member which is made of resin and defines the inlet passage communicated to the primary chamber. The housing member and the passage forming member are arranged so that the inlet passage and the secondary chamber adjacent each other by being separated by a wall. The wall defines a through hole which straightly penetrates the wall from the inlet passage to provide an orifice communicating the inlet passage and the secondary chamber without penetrating the movable member.

When the electromagnetic valve is operated to the open state to communicate the secondary chamber and the outlet passage, the movable member displaces toward the secondary chamber and opens the valve. Thereby, the inlet passage and the outlet passage are communicated. When the electromagnetic valve is operated to the closed state to shut off between the secondary chamber and the outlet passage, the movable member is displaced to the primary chamber side, and closes the valve. Thereby, a communication between the inlet passage and the outlet passage is shut off. The housing member and the passage forming member are arranged so that the inlet passage and the secondary chamber are adjacent to each other by being separated by the wall. This wall does not include any part of the movable member. The wall defines the through hole. The through hole penetrates the wall straightly from the inlet passage, and provides an orifice which communicates the inlet passage and the secondary chamber. According to this structure, since the housing and the passage forming member are arranged so that the inlet passage and the secondary chamber are adjacent to each other, and the through hole is formed in the wall between the inlet passage and the secondary chamber, the through hole can be formed without increasing a vapor permeable surface area. In addition, since the through hole does not penetrate the movable member, a stable open-and-close characteristic can be acquired. The through hole extending straight from the inlet passage enables to improve productivity.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Referring to drawings, embodiments of the present disclosure will be described hereinafter. In the embodiments, the same parts and components as those in each embodiment are indicated with the same reference numbers and the same descriptions will not be reiterated. Components and parts corresponding to the components and parts described in the preceding description may be indicated by the same reference number and may not be described redundantly. In a case that only a part of component or part is described, other descriptions for the remaining part of component or part in the other description may be incorporated.

First Embodiment

Figure 1:
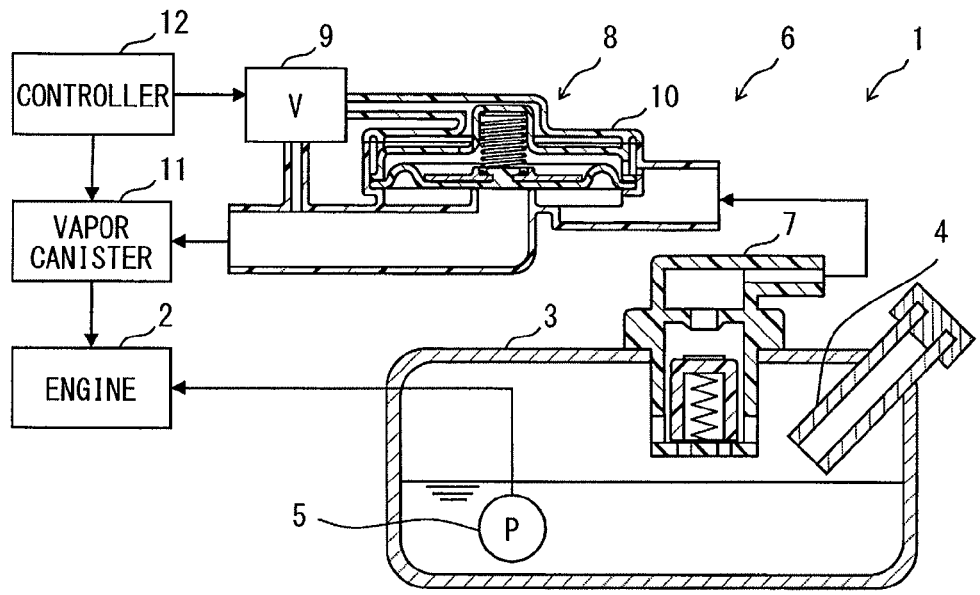
FIG. 1 is a block diagram showing a vehicular power system according to a first embodiment of the present disclosure.

In FIG. 1, the present disclosure may be practiced as a vehicular power system 1. The vehicular power system 1 has an engine 2 which works as a driving power source mounted on the vehicle. The engine 2 is an internal combustion engine. The vehicular power system 1 has a fuel supply system which supplies fuel to the engine 2. The fuel supply system has a fuel tank 3 for storing liquid fuel. A filler pipe 4 for supplying fuel is disposed on the fuel tank 3. Liquid fuel is supplied from the filler pipe 4. The filler pipe 4 is projected as a tubular shape into the fuel tank 3. The fuel supply system has a pump 5 which supplies the liquid fuel in the fuel tank 3 to the engine 2.

In order to supply liquid fuel into the fuel tank 3 from the filler pipe 4, it is necessary to discharge gas from the inside of the fuel tank 3. Gas in the fuel tank 3 contains air and fuel vapor which is vapor of fuel. In the following description, vapor and the air containing vapor are called vapor. Recently, it is required to reduce discharge amount of vapor to the air. The vehicular power system 1 has a fuel vapor control system (vapor control system) 6 in order to reduce discharge amount of vapor to the air.

The vapor control system 6 processes or burns vapor by flowing into the engine 2 and burning. The vapor control system 6 provides a vapor passage which communicates the fuel tank 3 and an intake pipe of the engine 2. The vapor passage is provided by a plurality of components and lines. The vapor control system 6 has a liquid cutoff valve 7, a vapor control valve 8, and a canister 11 on the vapor passage. The canister 11 is disposed between the engine 2 and the fuel tank 3. The vapor control valve 8 is disposed between the canister 11 and the fuel tank 3. The liquid cutoff valve 7 is disposed between the vapor control valve 8 and the fuel tank 3.

The liquid cutoff valve 7 selectively allows vapor flow out from the fuel tank 3 to the vapor passage. The liquid cutoff valve 7 prevents leakage liquid fuel to the vapor passage. The liquid cutoff valve 7 allows communication between the fuel tank 3 and the vapor passage by opening when a level of liquid fuel in the fuel tank 3 is less than a predetermined level, during the vehicle is in a normal tilt angle range. The liquid cutoff valve 7 shuts off communication between the fuel tank 3 and the vapor passage by closing when a level of liquid fuel in the fuel tank 3 reaches to the predetermined level. The liquid cutoff valve 7 is also a float valve which changes from an open state to a close state, when liquid fuel in the fuel tank 3 reaches to the liquid cutoff valve 7 by a tilt angle of the vehicle reaches to an unusual range. The liquid cutoff valve 7 may include components and function for adjusting a supply rate of liquid fuel into the fuel tank 3 by restricting discharge amount of vapor from the fuel tank 3 to the vapor passage.

The vapor control valve (hereafter referred to as a control valve) 8 is disposed between the fuel tank 3 and the canister 11, and opens and closes the vapor passage. The control valve 8 switches the fuel tank 3 to a closed state and an open state. The control valve 8 may has components and function as a relief valve which changes from a close state to an open state when a pressure in the fuel tank 3 side reaches to an unusually high pressure. The control valve 8 can be used in various applications, such as an application which controls discharge of vapor from the fuel tank 3, or an application which switches the fuel tank 3 to the closed state and the open state intentionally for inspecting the fuel tank 3 and the vapor control system 6.

The control valve 8 has an electromagnetic valve 9 electrically switchable to an open state and a closed state, and a differential pressure valve 10 switchable to an open state and a closed state in response to a pressure difference adjusted by the electromagnetic valve 9. Since the differential pressure valve 10 has a diaphragm which can be displaced in response to the pressure difference, it may be also referred to as a diaphragm valve 10.

The canister 11 adsorbs vapor and stores vapor temporarily. The canister 11 has adsorbent, such as activated carbon which can adsorb vapor. The canister 11 discharges vapor by supplying the fresh air which contains less vapor component.

The vapor control system 6 has a controller 12. The controller 12 controls the electromagnetic valve 9, in order to open and close the control valve 8. The controller 12 controls the control valve 8 for various applications. For example, the controller 12 may control the control valve 8 to adjust an amount of vapor supply from the fuel tank 3 to the canister 11. The controller 12 may control the control valve 8 to switch the fuel tank 3 to the closed state and the open state intentionally for inspection purpose. The controller 12 controls the canister 11 to control the adsorption of vapor to the canister 11, and the discharge of vapor from the canister 11. Specifically, the controller 12 opens and closes a plurality of passages connected to the canister 11. For example, the controller 12 controls a purge valve which opens and closes a purging passage which supplies fresh air to the canister 11.

The controller 12 is an electronic control unit. The controller has at least one processing unit (CPU) and at least one memory as a storage medium which stores and memorizes a program and data. The controller is provided by a microcomputer which has a storage medium which can be read by computer. The storage medium is a non-transitory storage medium which stores a program readable by the computer. The storage medium may be provided with semiconductor memory or a magnetic disc. The controller may be provided with a computer or a set of computer resources linked by a data communication device. The program, when the controller executes the program, makes the controller to function as the apparatus described in this specification, and makes the controller to function to perform methods, such as control method, described in this specification. The controller provides various components. At least a part of the components may be referred to as means for performing function, and from the other viewpoint, at least a part of the components may be referred to as compositional block or module.

Figure 2:
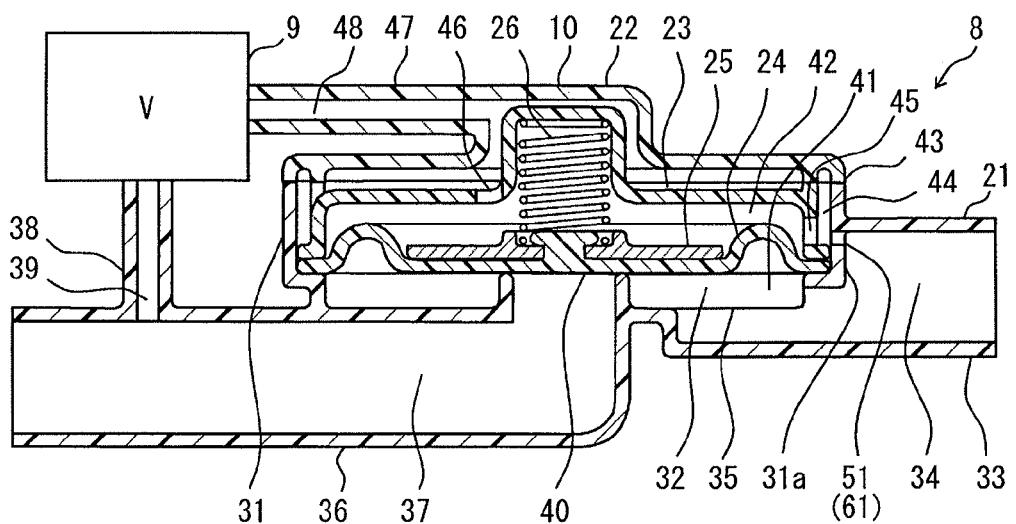
FIG. 2 is a cross sectional view of a vapor control valve according to the first embodiment.
Figure 3:
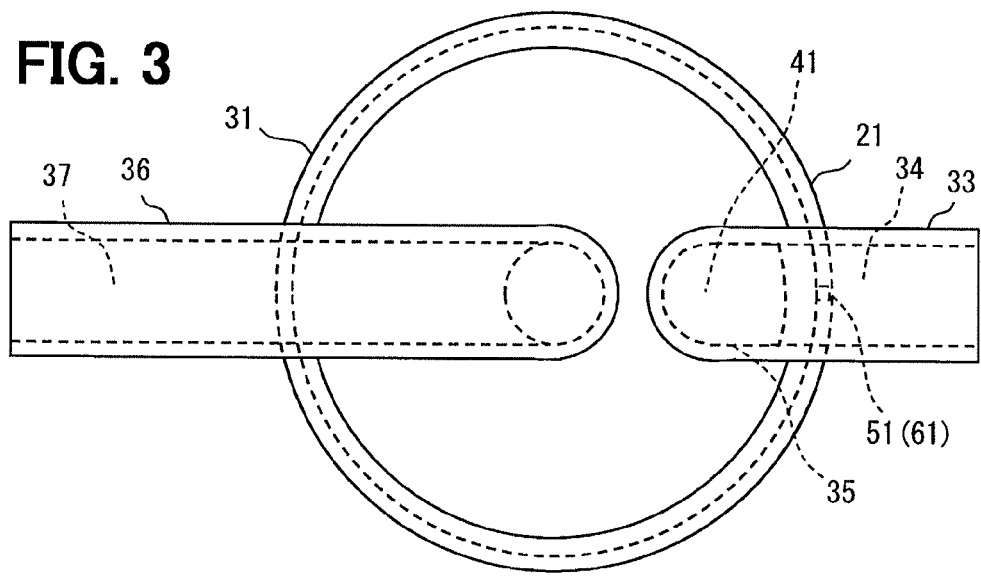
FIG. 3 is a bottom view of the vapor control valve according to the first embodiment.
Figure 4:
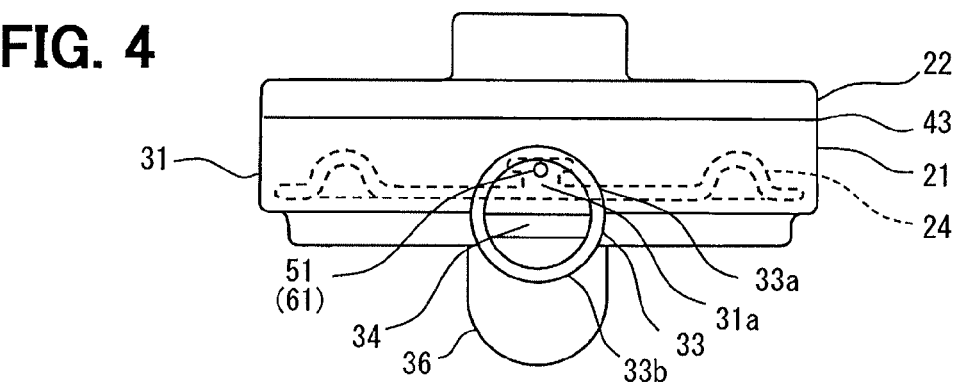
FIG. 4 is a side view of the vapor control valve according to the first embodiment.

FIG. 2 shows a cross sectional view of the control valve 8. FIG. 3 shows a bottom view of the control valve 8. FIG. 4 shows a side of the control valve 8 on a right side in FIG. 2. The control valve 8 has a case 21, an outer cap 22 and an inner cap 23. The case 21 provides a lower body. The outer cap 22 and the inner cap 23 provide an upper body. The case 21, the outer cap 22, and the inner cap 23 are products made of resin, such as polyacetal, polyamide, aromatic polyamide, saturated polyester, polyphenylene sulfide, polypropylene, and polyethylene. The outer cap 22 and the inner cap 23 provide a cap which is combined with the case 21 and defines an inner chamber.

A diaphragm 24, which is a movable member displaceable in response to a pressure difference, is arranged between the case 21 and the inner cap 23. The diaphragm 24 is a product made from deformable soft material, such as rubber and resin. The diaphragm 24 is fixed by fastening an outer rim thereof between the case 21 and the inner cap 23. The diaphragm 24 provides a movable valve by a center portion thereof.

A holder 25 formed in a plate shape is disposed on a center portion of the diaphragm 24 at a side facing the inner cap 23. The diaphragm 24 and the holder 25 are connected by inserting a plug part formed on the diaphragm 24 into a through hole on the holder 25. A coil spring 26 is disposed between the inner cap 23 and the holder 25. The coil spring 26 biases the diaphragm 24 by pushing the diaphragm 24 in a closing direction.

The case 21 has a cup portion 31 which may be referred to as a flat cylinder with a bottom or a flat cup. The cup portion 31 is cylindrical. The cup portion 31 defines an annular shaped gallery 32 therein. The cup portion 31 provides the housing member for defining the primary side pressure chamber facing the diaphragm 24. In another view, the cup portion 31 providing the housing member and the inlet pipe 33 providing the passage forming member are provided by a case 21 where the housing member and the passage forming member are integrally formed thereon.

As shown in FIG. 3, the case 21 has the inlet pipe 33 which projects from a radial outer portion of the cup portion 31 in a direction along a radial direction. The inlet pipe 33 is a cylindrical pipe. An inlet passage 34 is defined inside the inlet pipe 33. The inlet pipe 33 is the passage forming member connected to the housing member.

One end of the inlet passage 34 communicates to an inside of the cup portion 31, i.e., the gallery 32, via a communicating portion 35 mainly through an outside part of a bottom surface of the cup portion 31. The inlet passage 34 communicates to a secondary chamber 42 via a through hole 51, both will be described below. The other end of the inlet passage 34 communicates to the fuel tank 3 via the liquid cutoff valve 7. Since the inlet pipe 33 and the inlet passage 34 are located upstream from the cup portion 31 in the flow of vapor, the inlet pipe 33 and the inlet passage 34 may also be referred to as an upstream pipe 33 and an upper passage 34 respectively. The inlet pipe 33 and the inlet passage 34 may also be referred to as a high pressure pipe 33 and a high pressure passage 34 respectively.

The case 21 has an outlet pipe 36 which extends along the radial direction from the center section of the cup portion 31. The outlet pipe 36 is a cylindrical pipe. The outlet pipe 36 extends along the radial direction of the cup portion 31 so that the outlet pipe 36 enters below the cup portion 31 and reaches to the center section of the cup portion 31. The outlet pipe 36 defines an outlet passage 37 therein. The outlet pipe 36 projects into the cup portion 31. A fixed valve seat 40 of the differential pressure valve is formed on the end of the outlet pipe 36.

Returning to FIG. 2, the end of the outlet passage 37 communicates to an inside of the cup portion 31, i.e., the gallery 32, through the center section of the bottom of the cup portion 31. The other end of the outlet passage 36 communicates to the canister 11. Since the canister 11 communicates to the intake passage of the engine 2, it can be said that the outlet passage 36 communicates to the intake passage of the engine 2. Since the outlet pipe 36 and the outlet passage 37 are located downstream from the cup portion 31 in the flow of vapor, the outlet pipe 36 and the outlet passage 37 may also be referred to as a downstream pipe 36 and a downstream passage 36 respectively. The outlet pipe 36 and the outlet passage 37 may also be referred to as a low pressure pipe 36 and a low pressure passage 37 respectively.

The case 21 has a branch pipe 38 which branches from the outlet pipe 36. A branch passage 39 is defined inside the branch pipe 38. The branch passage 39 is connected to the electromagnetic valve 9. The branch passage 39 provides the back-pressure control passage which introduces low pressure for controlling a back pressure.

The outer cap 22 is formed in a flat cup shape. The outer cap 22 covers and blockades an open end of an upper part of the cup portion 31 of the case 21. The inner cap 23 is accommodated and fixed in a chamber defined between the case 21 and the outer cap 22. The inner cap 23 is securely connected with the outer cap 22, and functions as an integrated cap. The inner cap 23 is arranged between the outer cap 22 and the diaphragm 24. The inner cap 23 functions as a holding member which presses down the perimeter rim of the diaphragm 24. The inner cap 23 provides a seat surface for the coil spring 26.

The case 21 and the outer cap 22 provide the housing member which accommodates and supports the diaphragm 24. The case 21 and the outer cap 22 define an operating chamber between them. The diaphragm 24 divides the operating chamber into two. As a result, a primary chamber 41 is defined between the case 21 and the diaphragm 24. The primary chamber 41 may also be referred to as a high pressure chamber. A secondary chamber 42 is defined between the outer cap 22 and the diaphragm 24. The secondary chamber 42 may also be referred to as a low pressure chamber. The secondary chamber 42 may also be referred to as a backpressure chamber or a control pressure chamber.

The case 21 and the outer cap 22 are joined at a joint portion 43. The case 21 and the outer cap 22 are joined by an adhesive bond or welding at the joint portion 43. Furthermore, the outer cap 22 and the inner cap 23 may also be joined.

An annular gallery 44, which extends annularly at a radial outside portion of the inner cap 23, is defined between the case 21 and the inner cap 23. The annular gallery 44 is defined between a cylindrical wall surface forming the cup portion 31 of the case 21 and a cylindrical wall surface positioned outside of the inner cap 23. The annular gallery 44 is positioned radial inside of the joint portion 43, and faces the joint portion 43. A part of the annular gallery 44, i.e., an upper end portion in the drawing, is provided by an annular groove formed on the outer cap 22. The annular groove is positioned radial inside of the joint portion 43. The outer cap 22 and the inner cap 23 come in contact with each other at a radial inside of the annular groove.

Figure 5:
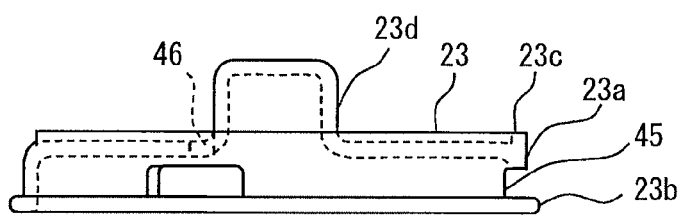
FIG. 5 is a side view of a cap of the vapor control valve according to the first embodiment.

FIG. 5 shows a side surface of the inner cap 23. The inner cap 23 has a cylindrical wall 23a. An annular flange 23b for pressing down the diaphragm 24 is formed on one end of the cylindrical wall 23a. An end surface 23c for contacting the outer cap 22 is formed on the other end of the cylindrical wall 23a. The inner cap 23 has a cover portion 23d which is formed on the other end side of the cylindrical wall 23a. The cover portion 23d provides the seat for the coil spring 26. The inner cap 23 has a plurality of through holes 45 and 46.

Returning to FIG. 2, the outer cap 22 has a back-pressure pipe 47. The back-pressure pipe 47 is connected to the electromagnetic valve 9. The back-pressure passage 48 is defined inside the back-pressure pipe 47. One end of the back-pressure passage 48 communicates to the secondary chamber 42. The other end of the back-pressure passage 48 communicates to the electromagnetic valve 9. The electromagnetic valve 9 is disposed between the secondary chamber 42 and the outlet passage 37. The electromagnetic valve 9 changes state between the secondary chamber 42 and the outlet passage 37 to an open state or a closed state. The branch passage 39 and the back-pressure passage 48 are configured to be able to communicate at an inside of the electromagnetic valve 9. The secondary chamber 42 is switched to a state where the secondary chamber 42 communicates with the outlet passage 37, and to a state where the secondary chamber 42 is shut off, i.e., isolated from, the outlet passage 37.

As shown in FIG. 2 and FIG. 4, the inlet pipe 33 and the cup portion 31 are arranged to be adjacent to each other on both sides of a boundary which is provided by the outer wall 31a mainly defining the cup portion 31. The inlet passage 34 and the secondary chamber 42 are arranged to be adjacent to each other by being separated by a single layer which is the outer wall 31a defining the secondary chamber 42. The inlet pipe 33 and the cup portion 31 are arranged to provide such arrangements. The outer wall 31a is disposed on the case 21 so that the outer wall 31a directly faces the secondary chamber 42.

As shown in FIG. 4, the inlet pipe 33 has an upper half part 33a and a lower half part 33b. The upper half part 33a comes in contact with the outer wall 31a of the cup portion 31. The outer wall 31a of the cup portion 31 is positioned in the upper half part 33a of the inlet pipe 33. When viewing from an opening end of the inlet pipe 33 straightly along an axial direction of the inlet pipe 33, a wall surface corresponding to the outer wall 31a of the cup portion 31 is positioned within the upper half part 33a. The outer wall 31a appearing within the inlet pipe 33 especially in the upper half part 33a is a wall surface corresponding to a portion above the diaphragm 24. The lower half part 33b extends along a radial direction of the cup portion 31 so that a part of the lower half part 33b enters below the cup portion 31, and comes in contact with a bottom of the cup portion 31. An inside of a gallery 32 within the cup portion 31 is visible at an upper part in the lower half part 33b. An end of the inlet pipe 33 is visible at a lower part in the lower half part 33b.

Thus, the inlet pipe 33, which is the passage forming member, has an upper half 33a as a first portion and a lower half 33b as a second portion. The inlet pipe 33 extends along a radial direction of the housing member. The first portion 33a comes in contact with the outer wall 31a. The second portion 33b extends along an axial end portion of the case 21 as the housing member. The second portion 33b provides a communication passage 35 which communicates the inlet passage 34 and the primary chamber 41 at an axial end of the case 21.

A through hole 51 is formed in the outer wall 31a positioned in the upper half part 33a. One opening end of the through hole 51 opens to the inlet passage 34. The other opening end of the through hole 51 opens to the ring gallery 44. The ring gallery 44 communicates with the secondary chamber 42 via the through holes 45 and 46. Therefore, the through hole 51 communicates between the inlet passage 34 and the secondary chamber 42.

The through hole 51 is positioned so that the through hole 51 is exposed within an opening area of the inlet passage 34. The through hole 51 is positioned on a location which is visible along an axial direction of the inlet pipe 33 from an open end of the inlet pipe 33. The through hole 51 is positioned on the wall 31a which is visible within the inlet pipe 33 from the open end of the inlet pipe 33. The through hole 51 is positioned on a location which is visible from the open end of the inlet pipe 33 along a die separation direction of the molding die for molding an inside of the inlet pipe 33. The through hole 51 is positioned on an upper part of the opening area of the inlet pipe 33. The through hole 51 is positioned above the diaphragm 24 so that the through hole 51 can reach straightly to the secondary chamber 42.

The through hole 51 extends in parallel with and along an axial direction of the inlet pipe 33. The through hole 51 extends in parallel to a die separation direction in which the molding die for forming an inside of the inlet pipe 33 moves after molding. According to this structure, the through hole 51 extends in parallel to the axial direction of the inlet pipe 33 from the inlet passage 34, and reaches to the secondary chamber 42. The through hole 51 is defined by a die mold surface which is simultaneously formed with the outer wall 31a by a molding die which forms the outer wall 31a. Therefore, it is possible to form the housing member and the passage forming member by using an injection molding technique in which a resin material is injected into a molding die which can be separated after molding.

The through hole 51 is also an orifice 61 which sets a flow resistance between the inlet passage 34 and the secondary chamber 42 to a comparatively greater level. The through hole 51 is also called an orifice. By disposing the orifice 61, the pressure inside the secondary chamber 42 can be switched to the pressure in the inlet passage 34, and the pressure of the outlet passage 37, in response to an opening and closing of the electromagnetic valve 9. As a result, the control valve 8 is opened and closed.

When the electromagnetic valve 9 is closed, the secondary chamber 42 communicates only with the inlet passage 34 via the through hole 51. Therefore, when the electromagnetic valve 9 is closed, the pressure in the secondary chamber 42 becomes the same as the pressure of the inlet passage 34. As a result, the diaphragm 24 is forced on the seat 40 with the coil spring 26, and the control valve 8 is in the closed state.

When the electromagnetic valve 9 is opened, the secondary chamber 42 communicates with the inlet passage 34 via the through hole 51, and also communicates with the outlet passage 37 via the branch passage 39 and the back-pressure passage 48. Since the through hole 51 is an orifice, the pressure in the secondary chamber 42 becomes the pressure in the outlet passage 37. Since the outlet passage 37 is communicated with the engine 2 via the canister 11, the outlet passage 37 is filled with low pressure by an intake pressure of the engine 2. As a result, the diaphragm 24 is pushed and displaced upwardly from the primary chamber 41 to the secondary chamber 42 against the coil spring 26. Accordingly, the control valve 8 becomes the open state.

Returning to FIG. 2, the annular gallery 44 is positioned radial inside to the joint portion 43. Thereby, the annular gallery 44 catches debris which invades inside from the joint portion 43. For example, in a case that a hot plate welding or an ultrasonic welding is applied to the joint portion 43, the annular gallery 44 provides a capturing pocket which catches debris and burrs caused by the welding process. In a case that an adhesive bond is applied to the joint portion 43, the annular gallery 44 provides a capturing pocket which catches adhesives which overflows from the joint portion 43. The annular gallery 44 lowers risk of debris reaching to the through hole 51.

Figure 6:
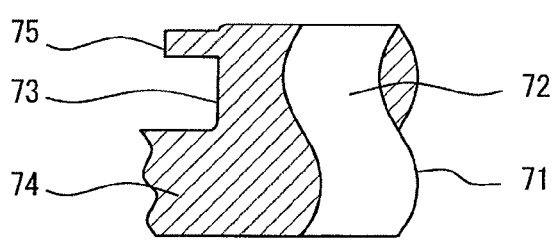
FIG. 6 is a partial cross sectional view of a molding die for the vapor control valve according to the first embodiment.

FIG. 6 shows a partial cross sectional view of the molding die for molding the case 21 having the through hole 51. The molding die 71 has a cylindrical portion 72 for molding the inlet passage 34. A stepped end 73, which has a step corresponding to a stepped corner portion of the cup portion 31, is formed on the distal end of the molding die 71. The stepped end 73 has a circular concave surface which corresponds to a peripheral surface of the cup portion 31. Under the stepped end 73, a semicircle pillar portion 74 for forming the part of the inlet passage 34 which enters below the cup portion 31 is formed. A stepped portion is formed by the stepped end 73 and the semicircle pillar portion 74. A thin cylindrical pin 75 for forming the through hole 51 is disposed on an upper part of the stepped end 73.

The pin 75 extends in parallel to the axial direction of the inlet passage 34. In other words, the pin 75 extends in parallel to an axis of the cylindrical portion 72. A peripheral surface of the pin 75 may be formed in a slightly tapered shape in order to separate the pin 75 and the molding die 71 from the case 21 molded.

The molding die 71 is a slidable die which can move along the axial direction of the cylindrical portion 72, in order to mold the inlet passage 34. The pin 75 extends along a slidable direction of the molding die 71. Therefore, the inlet passage 34 and the through hole 51 are simultaneously formed by using the molding die 71.

In this embodiment, the cup portion 31, the outer cap 22, and the inner cap 23 of the case 21 provide the housing member made of resin which defines the volume chambers 41 and 42 therein. The diaphragm 24 provides the movable member. The diaphragm 24 is supported by the housing member. The diaphragm 24 divides the volume chamber into the primary chamber 41 and the secondary chamber 42. The diaphragm 24 opens and closes the valve 40, which is disposed between the inlet passage 34 and the outlet passage 37, by displacing in response to a pressure difference between the primary chamber 41 and the secondary chamber 42. The inlet pipe 33 provides a passage forming member 33 which is made of resin and defines the inlet passage 34 communicated to the primary chamber 41. The housing member and the passage forming member are arranged so that the inlet passage 34 and the secondary chamber 42 are adjacent to each other by being separated by the wall 31a which does not include the movable member. The wall 31a defines a through hole 51 which penetrates the wall 31a straightly from the inlet passage 34, and provides the orifice 61 which communicates between the inlet passage 34 and the secondary chamber 42, without penetrating the diaphragm 24 which is the movable member.

According to this embodiment, the inlet pipe 33 is arranged so that the inlet passage 34 and the secondary chamber 42 are adjacent to each other. As a result, the inlet passage 34 and the secondary chamber 42 can be communicated directly, without requiring any passage member extending outwardly from the inlet pipe 33. Therefore, it is possible to reduce the vapor permeable surface area. Since the through hole 51 is formed in the outer wall 31a which defines the secondary chamber 42, it is possible to communicate the inlet passage 34 and the secondary chamber 42 without requiring any hole which penetrates the diaphragm 24. The through hole 51 is formed to function as the orifice 61. Therefore, it is possible to provide the control valve 8 which has a stable open-and-close characteristic. It is possible to control vapor flow in a stable manner by stabilizing the open-and-close characteristic of the control valve 8.

The through hole 51 is formed by the molding die 71 for molding the case 21. The inlet pipe 33 is arranged to extend straightly towards the outer wall 31a which forms the secondary chamber 42. The through hole 51 is formed by a pin 75 disposed on the molding die, e.g., a slidable molding die, for molding the inlet passage 34 within the inlet pipe 33. This arrangement contributes to improve productivity of the control valve 8.

Second Embodiment

This embodiment is one of modifications based on a basic form provided by the preceding embodiment. In the preceding embodiment, the cap is provided by the outer cap 22 and the inner cap 23. Alternatively, in this embodiment, a single cap 222 is used.

Figure 7:
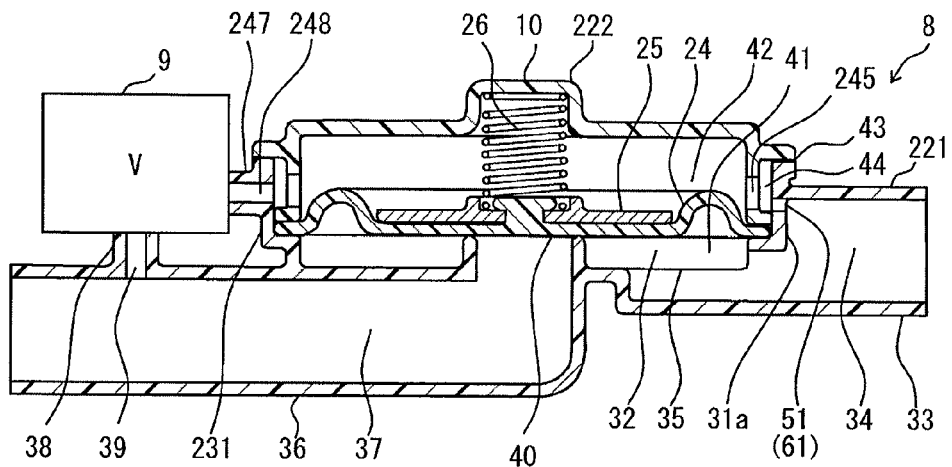
FIG. 7 is a cross sectional view of a vapor control valve according to a second embodiment of the present disclosure.

Referring to FIG. 7, a case 221 has a back-pressure pipe 247 which communicates to the annular gallery 44, and a back-pressure passage 248. The back-pressure pipe 247 extends from a cup portion 231. The back-pressure pipe 247 and the back-pressure passage 248 correspond to the back-pressure pipe 47 and the back-pressure passage 48, respectively. A cap 222 has portions corresponding to the outer cap 22 and the inner cap 23.

Figure 8:
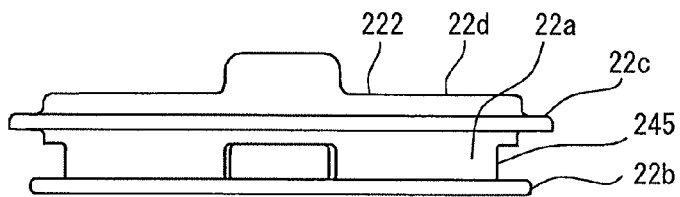
FIG. 8 is a side view of a cap of the vapor control valve according to the second embodiment.

Referring to FIG. 8, the cap 222 has the cylindrical wall 22a for pressing down the diaphragm 24 and for defining the annular gallery 44. An annular flange 22b for pressing down the diaphragm 24 is formed on one end of the cylindrical wall 22a. A flange 22c for joining to the case 221 is formed on the other end of the cylindrical wall 22a. The cap 222 has a cover portion 22d formed on the other end side of the cylindrical wall 22a. The cover portion 22d provides a seat surface for the coil spring 26. The cap 222 has a plurality of through holes 245.

In this arrangement, the annular gallery 44 is formed between the cylindrical wall 22a of the cap 222 and the cup portion 231. The through hole 245 communicates between the annular gallery 44 and the secondary chamber 42. The through hole 245 also provides communication between the secondary chamber 42 and the back-pressure passage 248. According to this structure, since the cap 222 is provided as a single component, it is possible to provide the control valve 8 with less number of components.

Third Embodiment

This embodiment is one of modifications based on a basic form provided by the preceding embodiment in the preceding embodiment, the annular gallery 44 is formed between the through hole 51 and the secondary chamber 42. Alternatively, in this embodiment, the through hole 51 and the secondary chamber 42 are communicated without forming the annular gallery 44.

Figure 9:
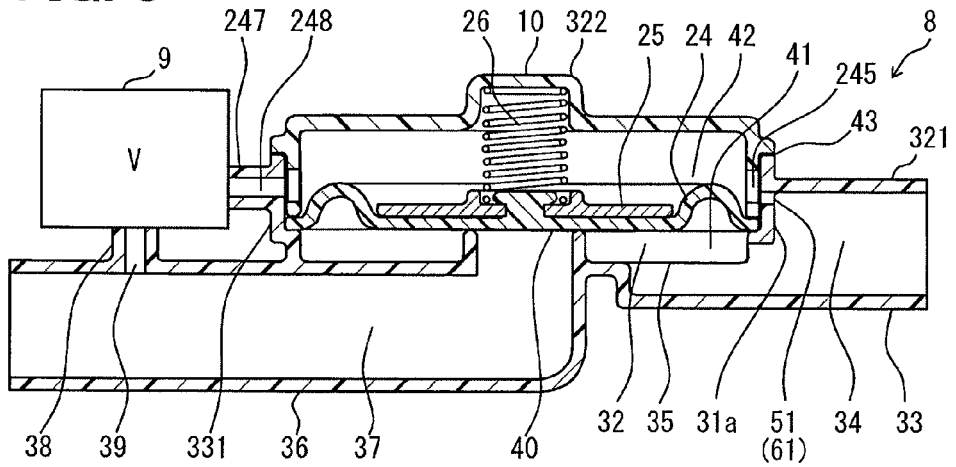
FIG. 9 is a cross sectional view of a vapor control valve according to a third embodiment of the present disclosure.

In FIG. 9, the case 321 has the cup portion 331 which is smaller in diameter than the cup portions 31 and 231 of the cases 21 and 221 in the preceding embodiments. As a result, the annular gallery 44 is not formed between the cup portion 331 and the cap 322. The case 321 and the cap 322 are joined after relative rotational position of the cap 322 is adjusted so that the through hole 51 and the through hole 245 are directly communicated by positioning one of the through hole 245 at a position corresponding to the through hole 51. Simultaneously, the case 321 and the cap 322 are joined after relative rotational position of the cap 322 is adjusted so that the back-pressure passage 248 and the through hole 245 are directly communicated by positioning one of the through hole 245 at a position corresponding to the back-pressure passage 248. According to this embodiment, it is possible to make the diameter of the cup portion 331 small. As a result, it is possible to provide a small control valve 8.

Fourth Embodiment

This embodiment is one of modifications based on a basic form provided by the preceding embodiment. In the preceding embodiment, the inlet pipe 33 is formed so that the inlet pipe 33 extends in the radial direction to the cup portion 31 formed in a flat cylindrical shape. Alternatively, in this embodiment, the inlet pipe 33 formed to extend in an axial direction to the cup portion 31 is used.

Figure 10:
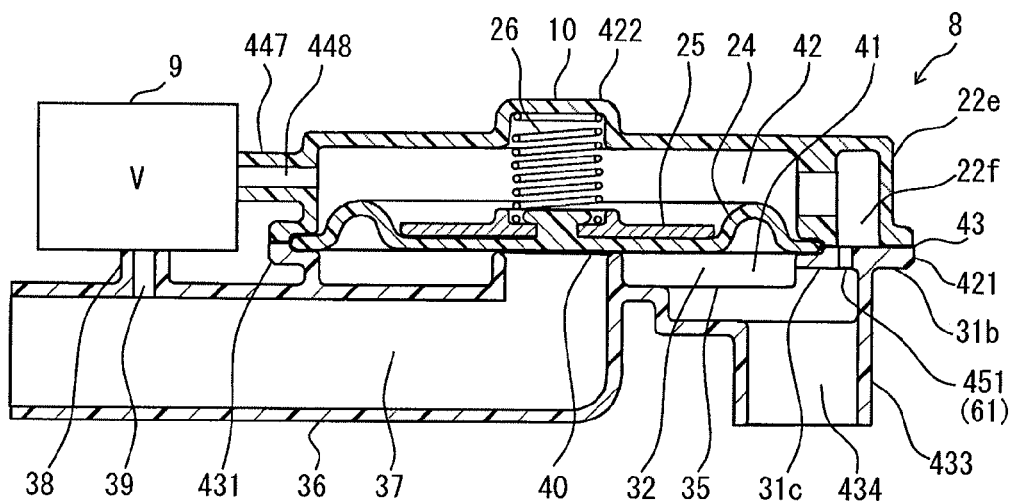
FIG. 10 is a cross sectional view of a vapor control valve according to a fourth embodiment of the present disclosure.

FIG. 10 shows a cross sectional view of the control valve 8. A case 421 has a cup portion 431 formed in a cylindrical shape. An inlet pipe 433 is formed to extend in an axial direction of the cup portion 431. An inlet passage 434 is defined inside the inlet pipe 433. A cap 422 is joined to the case 421. The cap 422 has a back-pressure pipe 447 and a back-pressure passage 448.

Figure 11:
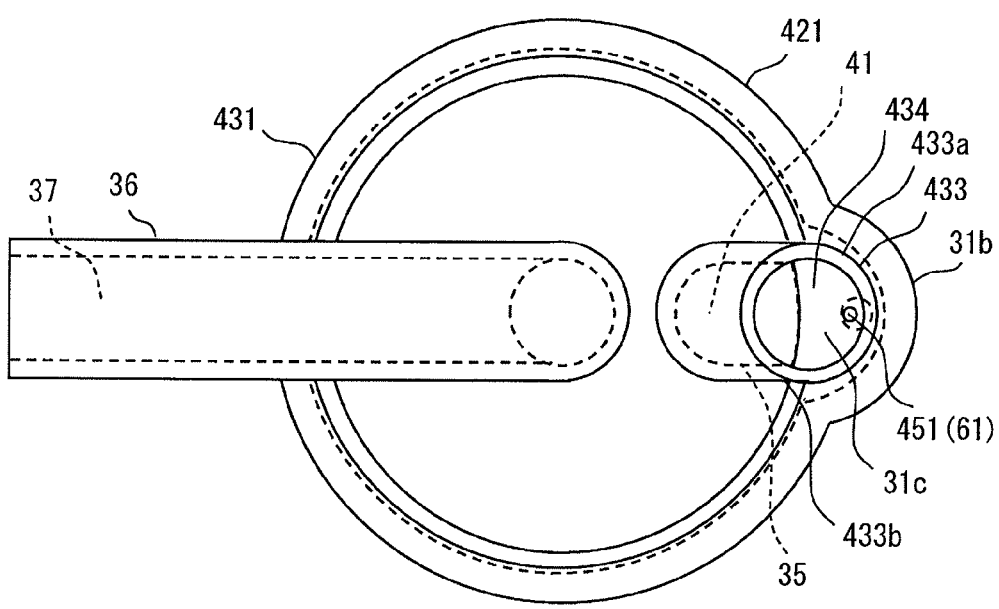
FIG. 11 is a bottom view of the vapor control valve according to the fourth embodiment.

FIG. 11 is a bottom view of the control valve 8 viewing from the lower side in FIG. 10. The inlet pipe 433 is positioned so that a part of the inlet pipe 433 overlaps with a part within a circular area defined by the cup portion 431. The inlet pipe 433 is positioned so that a part of the inlet pipe 433 comes in contact with the bottom of the cup portion 431. The inlet pipe 433 is positioned so that another part of the inlet pipe 433 protrudes outwardly from the circular area defined by the cup portion 431. Accordingly, the case 421 has a partially protruding shape which partially protrudes in a radial outside direction at a part where the inlet pipe 433 is formed. The cup portion 431 of the case 421 has a circular portion for accommodating the diaphragm 24, and a protruding portion 31*b* which protrudes in a semicircular shape in a radial outside direction from the circular portion.

Returning to FIG. 10, the cap 422 has a shape corresponding to the case 421. That is, the cap 422 has a circular portion for accommodating the diaphragm 24, and a protruding portion 22*e* which protrudes in a semicircular shape in a radial outside direction from the circular portion. The protruding portion 22*e* is positioned on extension of the inlet pipe 433. A chamber 22*f* is defined inside the protruding portion 22*e*. The chamber 22*f* communicates to the secondary chamber 42, and provides an extended part of the secondary chamber 42. A protruding wall 31*c*, which is provided by the case 421, is disposed between the inlet passage 434 and the chamber 22*f*. The protruding wall 31*c* is a wall which spreads corresponding to the protruding portion 31*b*. In the example illustrated, the protruding wall 31*c* spreads in a semicircular shape. The protruding wall 31*c* is located between the inlet passage 434 and the chamber 22*f*. Since the chamber 22*f* communicates to the secondary chamber 42, it can be said that the protruding wall 31*c* is disposed between the inlet passage 434 and the secondary chamber 42.

The through hole 451 is formed in the protruding wall 31*c*. The through hole 451 provides an orifice 61. The through hole 451 extends in parallel to a die separation direction in which the molding die for forming the protruding wall 31*c* moves after molding. The through hole 451 communicates the inlet passage 434 and a chamber 22*f*, i.e., the secondary chamber 42. The through hole 451 extends in parallel to an axial direction of the inlet pipe 433. The through hole 451 is formed by a pin disposed on the molding die for molding the inlet passage 434 within the inlet pipe 433.

In this embodiment, the housing member provided by the cap 422 and the cup portion 431 is also formed in a tubular shape. The housing member has a circular portion which accommodates the diaphragm 24, i.e., the movable member, and the projection portions 22*e* and 31*b* which project from the circular portion to radial outside directions. The protruding wall 31*c* disposed on the projection portion 31*b* provides a wall. The passage forming member is provided by the inlet pipe 433 extending along the axial direction of the housing member. This inlet pipe 433 has a first portion 433*a* and a second portion 433*b*. The first portion 433*a* comes in contact with the protruding wall 31*c*. The second portion 433*b* provides a communicating portion 35 for communicating the inlet passage 434 and the primary chamber 41 at an end the housing member.

The inlet passage 434 is arranged to be separated from the secondary chamber 42 by a single layer of the protruding wall 31*c*. Thereby, the inlet passage 434 and the secondary chamber 42 can be communicated by only forming the through hole 451 in the protruding wall 31*c*. The through hole 451 extends along the die separation direction of the molding die for forming the protruding wall 31*c*. The through hole 451 is formed by a pin disposed on the molding die for molding the protruding wall 31*c*.

Other Embodiments

The present disclosure is not limited to the above embodiments, and the present disclosure may be practiced in various modified embodiments. The present disclosure is not limited to the above combination, and disclosed technical means can be practiced independently or in various combinations. The embodiment can have an additional part. The part of embodiment may be omitted. The part of embodiment may be replaced or combined with the part of other embodiment. The configurations, functions, and advantages of embodiments are examples. The technical scope of disclosure is not limited to the statement of embodiment. Some extent of the disclosure may be shown by the scope of claim, and also includes the changes, which is equal to and within equivalents of the scope of claim.

For example, instead of the through hole 51, a large through hole, which replaces the through hole 51 but cannot work as the orifice 61, may be formed, and a narrow passage, which can work as the orifice 61, may be formed between the large through hole and the secondary chamber 42. For example, instead of the plurality of through holes 45 and 46 disposed in the inner cap 22, a through hole, which can work as the orifice 61, may be formed.

In above-mentioned embodiment, the device has the inlet pipes 33 and 433. Alternatively, an inlet pipe that has larger diameter may be used. For example, the inlet pipe 33 shown in FIG. 2 may be removed, and the control valve 8 except the outlet pipe 36 may be arranged within the inlet passage 34. In this structure, the through hole 51 formed on the outer wall 31a can contribute to reduce a vapor permeable surface area, and to provide a stable open-and-close characteristic. An alternative arrangement may be employed instead of the inlet pipe 433 shown in FIG. 10. In this arrangement, the inlet passage 434 may be provided by a component which accommodates the whole case 421 or a component which extends from the cap 422 and covers the whole case 421. In this structure, the through hole 51 formed on the protruding wall 31c can contribute to reduce a vapor permeable surface area, and to provide a stable open-and-close characteristic. In such structures, the passage forming member forming the inlet passage is provided by a member like a cover which accommodates the whole cases 21, 221, 321, and 421.

In the above-mentioned embodiments, structures in which the inlet passage 434 and the secondary chamber 42 are adjacent to each other and are separated by the protruding wall 31c are provided by forming the projection portions 22e and 31b. Alternatively, the valve may be configured so that the inlet passage 434 and the secondary chamber 42 are adjacent in a separated manner by a wall by forming the cup portion 431 larger in diameter. The cup portion 31, 231, 331 and 431 is not limited to a cylindrical shape and may be formed in various tubular shapes such as hexagonal shape. In the preceding embodiments, words "up", "down", "bottom", "above" and "below" are used for easy and better understanding, however, since the control valve 8 may be used in various orientations and attitudes, therefore, those words such as "up" and "down" do not limit the technical scope of this disclosure.

What is claimed is:

1. A vapor control valve for controlling vapor of fuel, comprising:
   a housing member which is made of resin and defines a volume chamber therein;
   a movable member, which is supported by the housing member, divides the volume chamber into a primary chamber and a secondary chamber and opens and closes a valve, which is located between an inlet passage and an outlet passage, wherein the valve is displaced in response to a pressure difference between the primary chamber and the secondary chamber;
   an electromagnetic valve, which is located between the secondary chamber and the outlet passage and changes a communication state between the secondary chamber and the outlet passage to an open state or a closed state; and
   a passage forming member, which is made of resin and defines the inlet passage communicated to the primary chamber, wherein
   the housing member and the passage forming member are arranged so that the inlet passage and the secondary chamber are adjacent to each other and are separated by a wall portion, and
   the wall portion defines a through hole, which penetrates the wall portion from the inlet passage to provide an orifice communicating the inlet passage with the secondary chamber without penetrating the movable member,
   a flow-restricting passage defined by the orifice is smaller than the inlet passage in a plane perpendicular to a direction in which vapor flows in the inlet passage, and
   at least an outer surface of the wall portion is located within the inlet passage.

2. The vapor control valve in claim 1, wherein the through hole is defined in its entirety by a die mold surface, and the through hole is simultaneously formed with the wall portion by a molding die that forms the wall portion.

3. The vapor control valve in claim 2, wherein the through hole extends in a direction that is parallel to a die separation direction, in which a molding die for forming the wall portion moves after molding.

4. The vapor control valve in claim 2, wherein
   the passage forming member is the inlet pipe connected to the housing member,
   the through hole is positioned in the wall portion, and
   the wall portion is visible within the inlet pipe from an opening end of the inlet pipe, and the through hole extends in an axial direction of the inlet pipe.

5. The vapor control valve in claim 1, wherein
   the housing member and the passage forming member are provided by a case where the housing member and the passage forming member are integrally formed, and
   the wall portion directly faces the secondary chamber and is part of a wall of the case that directly faces the secondary chamber.

6. The vapor control valve in claim 5, wherein
   the housing member has a tubular shape, and
   the wall portion is a portion of an outer wall of the housing member.

7. The vapor control valve in claim 6, wherein
   the passage forming member is an inlet pipe extending in a radial direction of the housing member, and
   the passage forming member includes:
      a first portion that contacts the outer wall; and
      a second portion that extends along an end of the housing member and provides a communicating portion for communicating the inlet passage with the primary chamber at the end of the housing member.

8. The vapor control valve in claim 5, wherein
   the housing member has a tubular shape, and
   the housing member includes:
      a circular portion that accommodates the movable member; and
      a projection portion that projects from the circular portion in a radially outward direction, and the wall portion is a projection wall located on the projection portion.

9. The vapor control valve in claim 8, wherein
   the passage forming member is an inlet pipe extending in an axial direction of the housing member, and
   the passage forming member includes:
      a first portion that contacts the protruding wall; and
      a second portion that provides a communicating portion for communicating the inlet passage with the primary chamber at the end of the housing member.

10. A vapor control system, comprising:
    the vapor control valve claimed in claim 1, wherein the vapor control valve is located between a fuel tank and an engine;

a canister located between the vapor control valve and the engine; and a controller, which controls the electromagnetic valve.

11. The vapor control valve in claim 1, wherein a communicating portion communicates the inlet passage with the primary chamber, and wherein an outer surface of the wall portion is located within the inlet passage between an entrance to the communicating portion and an entrance to the through hole.

12. The vapor control valve in claim 1, wherein the flow restricting passage formed by the through hole and the inlet passage are arranged to extend in the same direction.

13. The vapor control valve in claim 1, wherein the inlet passage communicates with a liquid cutoff valve, which is fixed to an upper part of a fuel tank and permits vapor of fuel from the fuel tank to flow into the inlet passage.

14. The vapor control valve in claim 1, wherein the state of the electromagnetic valve determines whether the movable member is in an open position or a closed position.

* * * * *